United States Patent
Hilbrig

(10) Patent No.: US 7,157,603 B2
(45) Date of Patent: Jan. 2, 2007

(54) METHOD FOR THE SEPARATION OF OLIGOMERIC N-SUBSTITUTED (METH)ACRYLAMIDE COMPOUNDS AND CONJUGATES THEREOF WHICH ARE REVERSIBLY THERMALLY PRECIPITATING

(75) Inventor: Frank Hilbrig, St. Sulpice (CH)

(73) Assignee: Polytag Technology SA, Lausanne (CH)

( * ) Notice: Subject to any disclaimer, the term of this patent is extended or adjusted under 35 U.S.C. 154(b) by 378 days.

(21) Appl. No.: 10/333,085

(22) PCT Filed: May 6, 2002

(86) PCT No.: PCT/CH02/00242

§ 371 (c)(1),
(2), (4) Date: Jan. 14, 2003

(87) PCT Pub. No.: WO02/092642

PCT Pub. Date: Nov. 21, 2002

(65) Prior Publication Data

US 2004/0010163 A1   Jan. 15, 2004

(30) Foreign Application Priority Data

May 14, 2001  (CH) .................................. 875/01

(51) Int. Cl.
*C07C 231/22* (2006.01)
(52) U.S. Cl. ............... 564/206; 564/204; 564/205; 426/422; 426/423; 526/304
(58) Field of Classification Search ............... 564/208, 564/204, 205, 206; 526/304; 426/422, 423
See application file for complete search history.

(56) References Cited

U.S. PATENT DOCUMENTS

| | | | | |
|---|---|---|---|---|
| 3,666,809 A | * | 5/1972 | Okuno et al. | 564/206 |
| 3,945,970 A | * | 3/1976 | Spoerke | 526/240 |
| 4,395,524 A | * | 7/1983 | Emmons et al. | 526/307.2 |
| 4,780,409 A | * | 10/1988 | Monji et al. | 435/7.36 |
| 4,841,011 A | * | 6/1989 | Towle | 528/125 |
| 5,973,203 A | * | 10/1999 | Egraz et al. | 564/135 |
| 6,464,850 B1 | * | 10/2002 | Zhang et al. | 204/455 |
| 6,986,911 B1 | | 1/2006 | Brocheton et al. | |

OTHER PUBLICATIONS

Yoshiyuki G. Takei et al: "Temperature-responsive bioconjugates . . . ", in Bioconjugates Chem. 1993, 4, pp. 42-46.
Ding Z et al: "Synthesis and purification of thermally sensitive . . . " Bioconjugate Chemistry, American Chemical Society, Washington, US vol. 7, 1996, pp. 121-125.

* cited by examiner

Primary Examiner—Shailendra Kumar
(74) Attorney, Agent, or Firm—Michael J. Striker

(57) ABSTRACT

The method of separating reversibly thermally precipitable oligomeric N-substituted (meth)acrylamides and conjugates thereof from aqueous solution includes thermally precipitating the oligomeric N-substituted (meth)acrylamides and the conjugates thereof from an aqueous solution in the presence of at least one salt and then filtering in the presence of at least one filter aid. The filter aid has a wet density of 0.2–0.3 g/cc and comprises $\geq$99% cellulose with fiber lengths<75 μm (99%) and=μm (65%). The salt can be a potassium, sodium, ammonium, calcium and/or magnesium chloride, acetate and/or sulfate salt and can be present in the aqueous solution in a concentration between 0.01 M and 3 M.

7 Claims, No Drawings

METHOD FOR THE SEPARATION OF OLIGOMERIC N-SUBSTITUTED (METH)ACRYLAMIDE COMPOUNDS AND CONJUGATES THEREOF WHICH ARE REVERSIBLY THERMALLY PRECIPITATING

This application is a 371 of PCT/CH02/00242, filed May 06, 2002.

BACKGROUND OF THE INVENTION

The present invention relates to a method for separating reversibly thermally precipitatable oligomeric N-substituted (meth)acrylamides and their conjugates from aqueous solution, as well as to separated, thermally precipitatable oligomeric N-substituted (meth)acrylamides and their conjugates, synthesized by the method.

In the area of polymer synthesis, radical telomerizing by means of a chain transfer reagent is a customary method of synthesizing a linear, low molecular weight polymer (having a degree of polymerization of less than 100 and molecular weights distributed very homogeneously) of controlled chain length and with a terminal functional group. By means of the functional group covalently bound conjugates, such as enzyme conjugates and affinity macroligands (AML), can be synthesized from the oligomers so produced.

A plurality of N-substituted (meth)acrylamides form water-soluble polymeric compounds, which precipitate reversibly from water above a lower critical demixing temperature, called the LCST (lower critical solution temperature). A list of monomers, which come into consideration, is given in the U.S. Pat. No. 5,162,582. The LCST is fixed by varying the monomer chemistry or the copolymer composition. It is, for example, 32° to 34° C. for poly-N-isopropylacrylamide in water. The LCST is independent of the chain length of the polymers and of the pH of the solution; as a rule, it is lowered by salts as a function of their molarity.

In methods known from the art, homogeneous, reversibly thermally precipitatable oligomers with terminal, functional groups are synthesized by telomerization in organic solvents or water. The yield is better than 60%. These oligomeric compounds are purified by repeated soluble-insoluble precipitations in organic solvents, such as acetone in hexane, with subsequent filtration and vacuum drying. The repeated purification is necessary in order to free the oligomeric preparation from the toxic monomers.

However, this purification method requires relatively large volumes of organic solvents having low water content. Experience has shown that, for a working-up step, approximately one liter of n-hexane with a water content of less than 0.05 percent is required in order to precipitate 10 g of oligomeric compound. The low water content of the organic solvent is required in order to avoid gelatinization of the oligomers during the precipitation and, with that, keep the oligomeric aggregates in a filtratable form. Accordingly, aside from the high costs for solvents and the use of many personnel for this purification method, which can be automated only with difficulty, this method is also very disadvantageous for reasons of operational safety and environmental protection, when used on an industrial scale with the volumes of solvents required for such a purpose.

The reversibly thermally precipitatable oligomers, the so-called "smart polymers" have a diversified area of applications in biotechnology, for example, in biocatalysis and bioseparation (affinity precipitation). For example, J. -P. Chen (J. Chem. Technol. Biotechnol. 73 (1998) 137–143) describes a conjugate with α-chymotrypsin, the enzyme activity and thermal stability of which are greater than those of native enzyme. For biocatalysis, such enzyme conjugates offer the advantages that the catalysis precedes homogeneously and that the biocatalysts can easily be separated by thermal precipitation and used once again.

Affinity precipitation is a bioseparation method, which utilizes the precipitation properties of the oligomers in combination with ligands, which have a specific affinity to a target substance, in order to separate and purify this target substance specifically.

In the WO 01/25287 A1, AML are described, which can be used efficiently for the purification of proteins and nucleic acids. However, the oligomers were produced only in small amounts and where purified either by precipitation in organic solvents or by diafiltration followed lyophilization. The latter method, however, is very time-consuming and can be used only for relatively small amounts. For the separation of thermally precipitatable oligomers and AML (including AML target substance complexes), centrifugation was selected because only small volumes were biopurified.

However, the industrial application of "smart polymers" in biocatalysis and bioseparation requires, on the one hand, a method for the synthesis of monomer-free oligomers on a large scale and, on the other, a method for the efficient separation of the thermal precipitates from a large volume. However, it is a common feature of all previously described examples of the separation of reversibly thermally precipitatable oligomers and their conjugates (enzyme conjugates, AML and AML target substances) from aqueous solution, that the precipitate separation was carried out by centrifugation using only using small volumes.

Y. G. Takei et al. (Bioconjugate Chem. 4 (1993) 42–46) have shown that, especially in the case of dilute solutions, low molecular weight oligomers require very high centrifugal accelerations, in order to separate more than 80 percent of the thermal precipitate. In the case of a 1 percent by weight solution of an oligomer with an average molecular weight of about 2,500 g/mole, only about 60 percent can be separated as precipitate even an a centrifugal acceleration of 10,000 g. Moreover, centrifugation has the disadvantage that it produces very compact precipitate gels, which can be dissolved again only very slowly. Moreover, it can be used only in batch operation and, with that, for relatively small volumes, since the thermal precipitate, because of its gelatinous consistency, cannot be supplied continuously.

Y. G. Takei et al. (Bioconjugate Chem. 4 (1993 42–46) have also shown that, in the case of oligomers with an average molecular weight of less than 5,000 g/mole, the filtration of the precipitate causes high losses. For example, only about 20 percent of precipitated oligomers with an average molecular weight of about 2,500 g/mole can be separated by filtration from a 1 percent by weight solution; at 10 percent by weight, the recovery rate increases to about 70 percent.

Accordingly, neither methods, which enable reversibly thermally precipitatable oligomers to be purified in large amounts without using organic solvents, nor methods, with which reversibly thermally precipitatable oligomers and their conjugates can be separated efficiently from aqueous solutions of large volume, are known from the state of the art.

SUMMARY OF THE INVENTION

It is an object of the present invention to make available a working up and separating method, which enables reversibly thermally precipitatable oligomers and their conjugates to be separated efficiently from an aqueous solution.

It is a further object of the present invention to make available oligomeric N-substituted (meth)acrylamides with an improved separation rate.

Pursuant to the invention, the objective is accomplished owing to the fact that the oligomeric N-substituted (meth)acrylamides and their conjugates are thermally precipitated and filtered in the presence of salts and in the presence of filter aids.

It was determined that oligomers and their conjugates can be separated rapidly and efficiently by the method of the present invention from any volume, for example, from 1 ml to 10,000 L of aqueous solution. With that, monomer-free (containing less than 1 ppm of monomer) oligomeric N-substituted (meth)acrylamides can be prepared by repeated separations or washings.

It is particularly advantageous that, with the method of the present invention, oligomers with an average molecular weight between 500 g/mole and 5,000 g/mole can be separated effectively. This is of particular advantage since, only in the case of short-chain oligomers, is the full coupling activity of the terminal, functional groups realized. In addition, only in the case of enzyme conjugates and AML with such short-chain oligomeric compounds, is a high enzyme activity and a diffusion-free and homogeneous affinity interaction assured.

It is equally advantageous that, with the method of the present invention, N-substituted (meth)acrylamide conjugates can be separated effectively from dilute solutions. It is a distinguishing feature of biocatalysis and biotechnological purification methods that the catalysts and the target substances, which are to be purified, are used or present only in small concentrations. For this reason, a certain amount of oligomer must be added as precipitation promoter to the reversibly thermally precipitatable oligomeric conjugates in order to achieve a good degree of separation. The amount of promoter must be matched to the desired degree of separation and degree of activity of the biocatalysts or AML. The degree of non-specific adsorption and/or absorption must also be taken into consideration when adding to the promoter. The addition of promoter should therefore be kept to a minimum. It has proven to be advisable that the total amount of oligomeric compounds and of their conjugates in aqueous solution is between 0.1 percent by weight and 10 percent by weight and preferably between 0.8 percent by weight and 3 percent by weight.

Appropriately, the oligomers and their conjugates have an LCST in water of between 10° C. and 80° C. At an LCST about 80° C., it is technically difficult to carry out a thermal precipitation. At an LCST below 10° C., it may become impossible to dissolve the precipitate when substances, which lowered the LCST, are added. With poly-N-isopropylacrylamide, poly-N-n-propylacrylamide, poly-N-acryloylpyrolidine and the co-oligomers, composed of N-isopropylacrylamide and N,N-dimethylacrylamide in a molar ratio of 80:20, said LCST range is covered. The corresponding monomers are chemically simple and can be produced economically.

It is furthermore advantageous if the thermal precipitation is carried out in the presence of salts. At a temperature above the LCST, pure oligomers form finely divided, unstable aggregates, which can be separated only to an inadequate degree. Aside from the, as a rule, LCST-lowering effects, salts, at low molarities, have a decisive effect on the aggregation behavior of thermal precipitates. For example, in the presence of sodium acetate, very fine, separate precipitate particles are formed, which have a tendency to float. On the other hand, gelatinous, coherent precipitates frequently are formed with chloride salts. The selection of salts, their mixture and amount can only be made empirically for the special application.

In this connection, the aggregation-promoting properties as well as the LCST-lowering properties of the salts must be taken into consideration. A total salt concentration of between 0.01 M and 3 M is advantageous. For most applications, however, total sold concentrations of 0.5 M to 1.5 M are sufficient to affect the aggregation-behavior of the precipitate, so that a high separation rate can be achieved while filtering.

Furthermore, the temperature above the LCST, at which the oligomers and their conjugates are precipitated and filtered, is important. Advisably, the precipitation temperature and also the filtration temperature is 1° C. to 20° C. above the LCST. At a temperature more than 20° C. above the LCST, losses occur, because the precipitate aggregates dissolve once again. A temperature range of 5° C. to 10° C. above the LCST is preferred. It is important that the temperature does not to drop during the filtration. If it were to drop, there could also be losses during the separation because the precipitate dissolves once again.

Filter aids are of decisive importance for separating thermally precipitatable N-substituted (meth)acrylamides and their conjugates efficiently from aqueous solution. It has proven to be appropriate to use a cellulose with the following, additional properties as filter aid:

proportion of cellulose: $\geqq 99$ percent wet density: 0.2–0.3 g/cc fiber length: <75 μm (99%), <32 μm (65%).

This has the advantage that thermally precipitatable oligomeric compounds can be separated efficiently with a degree of separation of more than 90 percent, an adequately high filtration flow and a moderate differential pressure. The filter aids may be added already during the thermal precipitation or to the oligomeric compounds, which have already been precipitated thermally. The separation of a thermal precipitate over a bed of filter aid is also possible. The most advantageous variation is the presence of filter aids during the precipitation. By these means, the filter aid is incorporated in the aggregating thermal precipitate and the separation of the finest aggregates accordingly becomes possible. It is furthermore advantageous that, especially when cellulose is used, the precipitates can rapidly be dissolved once again at a temperature below the LCST. Aside from the efficiency, the use of a filter aid of high purity has the advantage that its surfaces are standardized and, with that, their properties can be controlled and/or modified. Above all, for affinity precipitation methods, losses due to adsorption at the surface of the filter aid and/or non-specific adsorption effects can be minimized.

However, the amount of filter aid, based on the weight percent of the precipitate from the solution, which is to be filtered, the filtration area and the magnitude of the maximum filtration pressure to, which is to be applied, can only be determined empirically.

The invention is explained in greater detail by means of an example.

EXAMPLE 1

Measurement Methods:

ICP Atom Emission Spectroscopy

The amount of oligomer in aqueous solution was determined from the sulfur content by means of ICP-AES (Plasma 1000 of Perkin Elmer) at a wavelength of 182.037 nm with automatic background correction and calibration with a sulfuric acid solution.

Reverse Phase HPLC

The N-isopropylacrylamido monomer concentration was determined by means of a reverse-phase Zorbax Rx C18 column (4.6 mm×25 cm) of Hewlett-Packard and an HPLC system, consisting of a TechLab binary pump, the ERC-3112 solvent degasser of ERMA CR and the UV/Vis SPD-10A detector of Shimadzu under the following conditions:

| Solvent A | water |
|---|---|
| Solvent B | acetonitrile |
| | 0–98% gradient in 30 minutes |
| Flow rate | 1 mL/min. |
| Injection volume | 20 µL |
| Detection | UV @ 214 nm |

Oligomeric N-sopropylacrylamide ($M_n$–2,300 g/mole) was synthesized by telomerization from N-isopropylacrylamide and azoisobutyronitrile in methanol at 65° C. Subsequently methanol was distilled off under vacuum and the oligomer was taken up in water.

To 150 ml of the aqueous oligomeric solution, cellulose (Diacel-75, trademark of the CFF Co.) and 8.766 g of sodium chloride were added at 15° C. (LCST=22° C.). The solution was heated with stirring to 30° C. and filtered in a thermostated filter funnel (10 cc: filter area, 200 ml capacity) over a PVDF warp/PTFE filling monofilament (11.5 µm pore size) as filter medium. Without pressure, a clear filtrate with an average flow of more than 4 $m^3/m^2h$ and a temperature of 29° C. was obtained. The filter cake was resuspended in 1 M sodium chloride at 15° C., and the oligomer was separated once again by thermal precipitation. This procedure was repeated a total of three times.

ICP-AES measurements of filtrate samples showed that, in comparison to standard measurements, more than 97 percent of the oligomers were separated from a 0.5 percent by weight solution during the last separation process. HPLC measurements of the filter cake show that the monomer contamination was reduced by a factor of 44 in one filtration step in comparison to standard measurements.

The invention claimed is:

1. A method of separating thermally precipitabie oligomeric N-substituted (meth)acrylamides and conjugates thereof from aqueous solutions in the absence of organic solvents, said oligomeric N-substituted (meth)acrylamides having an average molecular weight between 500 g/mol and 5000 g/mol;
   wherein said method comprises the steps of:
   a) thermally precipitating the oligomeric N-substituted (meth)acrylamides and the conjugates thereof from an aqueous solution containing at least one salt and cellulose fiber as a filter aid at a temperature of 1° C. to 20° C. above a lower critical solution temperature to fan an aqueous mixture;
   b) filtering the aqueous mixture containing the cellulose fiber and the at least one salt in addition to the oligomeric N-substituted (meth)acrylamides and the conjugates with a filter medium at said temperature, so that a separation degree of the at least one filter aid and the oligomeric N-substituted (meth)arylamides and the conjugates thereof from the aqueous solution is more than 90 percent;
   wherein, prior to the thermally precipitating of step a), the aqueous solution contains no organic solvents and contains from 0.1 percent by weight to 10 percent by weight of a total amount of said oligomeric N-substituted (meth)acrylamides with said molecular weight between 500 g/mol and 5000 g/mol and said conjugates thereof and from 0.01 M to 3 M of said at least one salt; and wherein said at least one salt is selected from the group consisting of potassium chloride, sodium chloride, ammonium chloride, calcium chloride, magnesium chloride, potassium acetate, sodium acetate, ammonium acetate, calcium acetate, magnesium acetate, potassium sulfate, sodium sulfate, ammonium sulfate, calcium sulfate, magnesium sulfate, and mixtures thereof.

2. The method as defined in claim 1, wherein said cellulose fiber has a wet density of 0.2–0.3 g/cc and comprises≧99% cellulose with 99% of the cellulose fiber having fiber lengths<75 µm and 65% of the cellulose fiber having fiber lengths<32 µm.

3. The method as defined in claim 1, wherein said filter medium comprises a polyvinylidene fluoride warp/polytetrafluoroethylene filling monofilament.

4. The method as defined in claim 1, wherein the oligomeric N-substituted (meth)acrylamides consist of repeating units of N-isopropylacrylamide, N-n-propylacrylamide or N-acryloylpyrrolidine.

5. The method as defined in claim 1, wherein the oligomeric N-substituted (meth)acrylamides consist of co-ollgomers of N-isopropylacrylamide and N,N-dimethylacrylamide in a monomeric ratio of 80:20.

6. The method as defined in claim 1, wherein said temperature, at which thermally precipitating and said filtering both occur, is 5° C. to 10° C. above the lower critical solution temperature.

7. The mixture as defined in claim 1, wherein said lower critical solution temperature is between 10° C. to 80° C. in water.

* * * * *